(12) United States Patent
Krishna (10) Patent No.: US 9,674,238 B2
(45) Date of Patent: Jun. 6, 2017

(54) MOBILE CONTENT COLLABORATION WITH ONE CLICK MULTIMEDIA CAPABILITY

(71) Applicant: CA, INC., New York, NY (US)

(72) Inventor: Vikas Krishna, San Jose, CA (US)

(73) Assignee: CA, INC., Islandia, NY (US)

( * ) Notice: Subject to any disclaimer, the term of this patent is extended or adjusted under 35 U.S.C. 154(b) by 36 days.

(21) Appl. No.: 14/610,170

(22) Filed: Jan. 30, 2015

(65) Prior Publication Data

US 2016/0226932 A1 Aug. 4, 2016

(51) Int. Cl.
  *H04W 4/00* (2009.01)
  *H04L 29/06* (2006.01)
  *H04W 4/14* (2009.01)

(52) U.S. Cl.
  CPC ............. *H04L 65/403* (2013.01); *H04W 4/14* (2013.01)

(58) Field of Classification Search
  None
  See application file for complete search history.

(56) References Cited

U.S. PATENT DOCUMENTS

| | | | | |
|---|---|---|---|---|
| 8,599,801 B2* | 12/2013 | Baio | ...................... | G06Q 30/02 370/312 |
| 2010/0257239 A1* | 10/2010 | Roberts | .................. | G06Q 10/10 709/204 |
| 2013/0165086 A1* | 6/2013 | Doulton | ............... | G06Q 10/107 455/414.4 |

* cited by examiner

*Primary Examiner* — Idowu O Osifade
(74) *Attorney, Agent, or Firm* — Sage Patent Group (57) ABSTRACT

A method includes performing operations as follows on a processor: receiving a selection of a content item by a first user from a first mobile device, sending an inquiry to the first mobile device comprising collaboration options for the content item, the collaboration options comprising a first option to invite a second user to collaborate asynchronously on the content item and a second option to invite the second user to collaborate synchronously on the content item via a communication session between the first mobile device and a second mobile device associated with the second user, receiving a selection of one of the first option and the second option by the first user from the first mobile device, identifying an address of the second mobile device responsive to receiving the selection of one of the first option and the second option, and sending a message addressed to the address of the second mobile device.

13 Claims, 9 Drawing Sheets

MOBILE CONTENT COLLABORATION WITH ONE CLICK MULTIMEDIA CAPABILITY

BACKGROUND

The present disclosure relates to computing systems, and, in particular, to collaboration between mobile devices.

The proliferation of mobile devices can present both opportunities and areas of concern for an enterprise. Because mobile devices may be more susceptible to being stolen, misplaced, or compromised in some way, enterprises may deploy a set of security tools that may provide a security layer around the mobile applications. Mobile Content Management (MCM) tools may provide the ability for a user to securely access, and collaborate on, content stored by an enterprise. As much of an enterprise's content may be considered sensitive or proprietary, an enterprise may place adopt policies that include restrictions on invoking certain applications or accessing certain types of data or files to ensure that sensitive information is not compromised. These restrictions may include operation limitations, geo fence limitations, time of day/week limitations, and access limitations. Other restrictions may include limitations on copying a file to local storage, e.g., a mobile device or desktop computer, for viewing or modification. The policies may also include requirements that various applications and/or other software components, such as operating systems, be upgraded before certain applications and/or data can be used. While such policies have a valid purpose in enhancing the security of mobile devices, the policies may in some instances, negatively impact use productivity. As a result, an enterprise may look for ways to boost user productivity and output through use of mobile devices. For example, an enterprise may install content and collaboration tools that can be used to provide a platform for users to manage a project including organizing, discussing, and tracking files among members of the project team. These tools may allow users to securely store and share content with version control to avoid having to email content to various members of a project team and manually keep track of the latest versions and changes.

SUMMARY

In some embodiments of the inventive subject matter, a method comprises performing operations as follows on a processor: receiving a selection of a content item by a first user from a first mobile device, sending an inquiry to the first mobile device comprising collaboration options for the content item, the collaboration options comprising a first option to invite a second user to collaborate asynchronously on the content item and a second option to invite the second user to collaborate synchronously on the content item via a communication session between the first mobile device and a second mobile device associated with the second user, receiving a selection of one of the first option and the second option by the first user from the first mobile device, identifying an address of the second mobile device responsive to receiving the selection of one of the first option and the second option, and sending a message addressed to the address of the second mobile device.

In still other embodiments of the inventive subject matter, a system comprises a processor and a memory coupled to the processor, which comprises computer readable program code embodied in the memory that when executed by the processor causes the processor to perform operations comprising: receiving a selection of a content item by a first user from a first mobile device, sending an inquiry to the first mobile device comprising collaboration options for the content item, the collaboration options comprising a first option to invite a second user to collaborate asynchronously on the content item and a second option to invite the second user to collaborate synchronously on the content item via a communication session between the first mobile device and a second mobile device associated with the second user, receiving a selection of one of the first option and the second option by the first user from the first mobile device, identifying an address of the second mobile device responsive to receiving the selection of one of the first option and the second option, and sending a message addressed to the address of the second mobile device.

In still other embodiments of the inventive subject matter, a computer program product comprises a tangible computer readable storage medium comprising computer readable program code embodied in the medium that when executed by a processor causes the processor to perform operations comprising: receiving a selection of a content item by a first user from a first mobile device, sending an inquiry to the first mobile device comprising collaboration options for the content item, the collaboration options comprising a first option to invite a second user to collaborate asynchronously on the content item and a second option to invite the second user to collaborate synchronously on the content item via a communication session between the first mobile device and a second mobile device associated with the second user, receiving a selection of one of the first option and the second option by the first user from the first mobile device, identifying an address of the second mobile device responsive to receiving the selection of one of the first option and the second option, and sending a message addressed to the address of the second mobile device.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

Some embodiments of the inventive subject matter stem from a realization that a mobile real time collaboration tool can be used to provide content collaboration applications on mobile devices and a content collaboration application on an enterprise server to allow users of the mobile devices to collaborate on enterprise content. A first user can select a content item and a window will pop-up presenting the first user with an option of sending a second user a message that identifies the content item and inviting the second user to asynchronously collaborate on the content item. The first user may also be presented with the option of contacting the second user so as to invite the second user to synchronously collaborate on the content item via an audio and/or video communication session in real time. This may allow the two parties to collaborate on the content item through a multi-media communication session. The content collaboration application on the enterprise server, for example, may provide various features to assist the first and second users in collaborating, whether synchronously or asynchronously, on the content item including, but not limited to, change control, version control, and comment capability, such as metadata associated with the content item and/or links to social media applications both public and internal to the enterprise.

Figure 1:
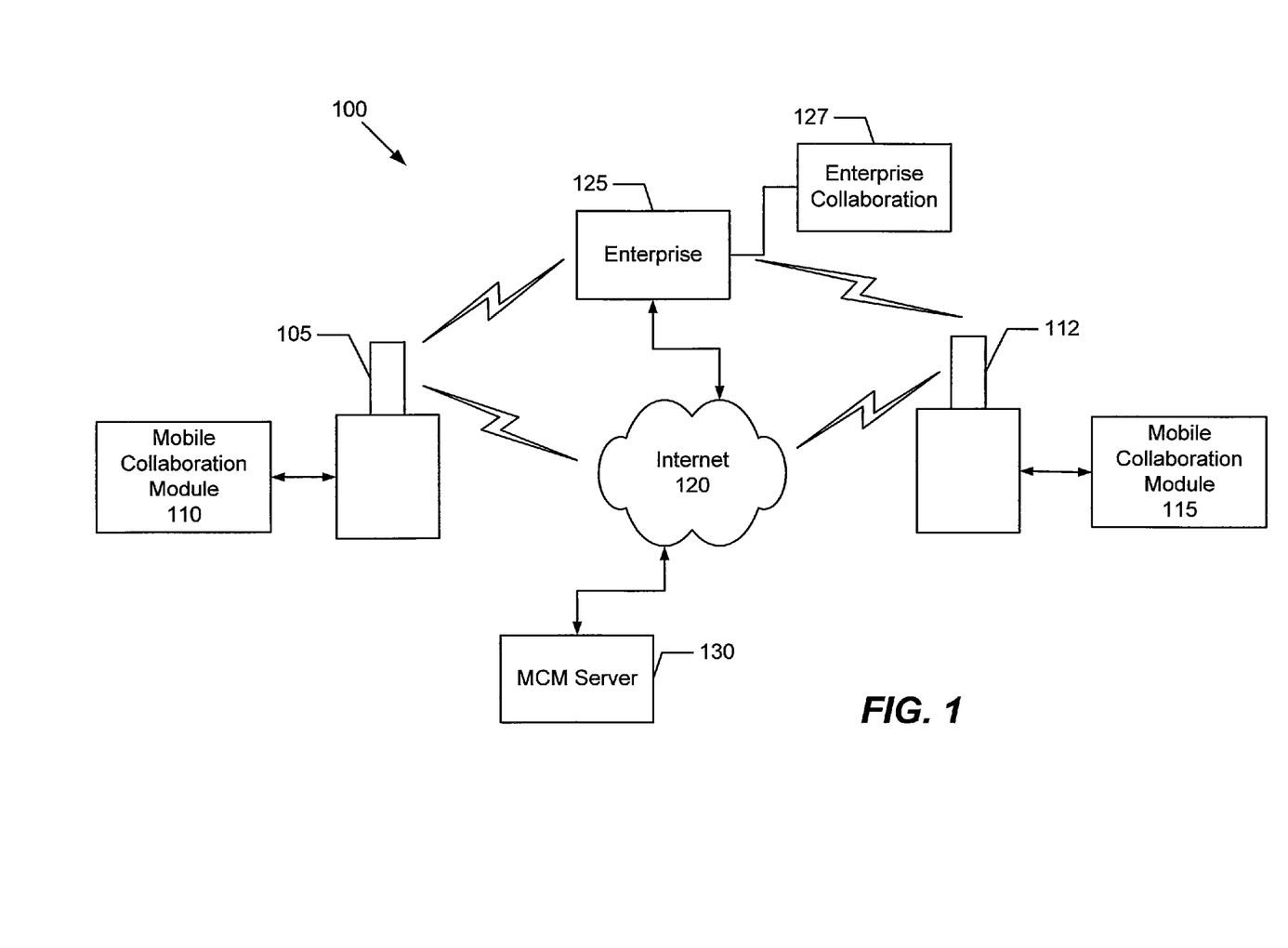
FIG. 1 is a block diagram of a system for facilitating mobile content collaboration in accordance with some embodiments of the inventive subject matter.

FIG. 1 is a block diagram of a system for facilitating mobile content collaboration in accordance with some embodiments of the inventive subject matter. Employees of an enterprise, for example, may use mobile devices, such as smart phones, tablets, laptops, and the like to access various types of content belonging to the enterprise to do their work. As shown in FIG. 1, a first user of a mobile device 105 may communicate with various servers of an enterprise 125 to access content thereon. Likewise, a second user of a mobile device 112 may communicate with the various servers of the enterprise 125 to access content thereon. The enterprise 125 may have numerous servers that are responsible for the various operations of the enterprise and for storing the enterprise content. The particular functional responsibilities and the storage of content can be combined or divided in a variety of ways. Moreover, the enterprise servers may be implemented as separate servers on individual hardware platforms or as virtual servers on a common hardware platform. In addition, the functionality of various servers may be combined in a single server or separated into additional servers in accordance with various embodiments of the inventive subject matter.

Employees of an enterprise may often work in teams or groups and multiple people may wish to provide input and/or comment on various content that the group or team is working on. The Mobile Content Management (MCM) server 130 may download mobile collaboration modules 110 and 115 to mobile devices 105 and 112, respectively, and may download an enterprise collaboration module 127 to the enterprise 125 server(s). The mobile collaboration modules 110 and enterprise collaboration module 127 may facilitate mobile content collaboration between the users of the mobile devices 105 and 112 for content stored on the enterprise 125 server(s). The enterprise collaboration module 127 is configured to manage access to content residing on the enterprise 125 server(s) in response to requests from users via the mobile collaboration modules 110 and 115. In some embodiments, a first user can select a content item residing on the enterprise 125 server(s) via the mobile collaboration module 110 and a window will pop-up presenting the first user with a first option of sending a second user (e.g., the user of mobile device 112) a message that identifies the content item and inviting the second user to collaborate on the content item asynchronously. The first user may also be presented with a second option of contacting the second user so as to invite the second user to collaborate on the content item synchronously via an audio and/or video communication session in real time. This may allow the two parties to collaborate on the content item through a multi-media communication session.

As shown in FIG. 1, the connections between the enterprise 125, MCM server 130, and the mobile devices 105, 112 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for mobile content collaboration according to some embodiments of the inventive subject matter, it will be understood that embodiments of the present invention are not limited to such configurations, but are intended to encompass any configuration capable of carrying out the operations described herein.

Figure 2:
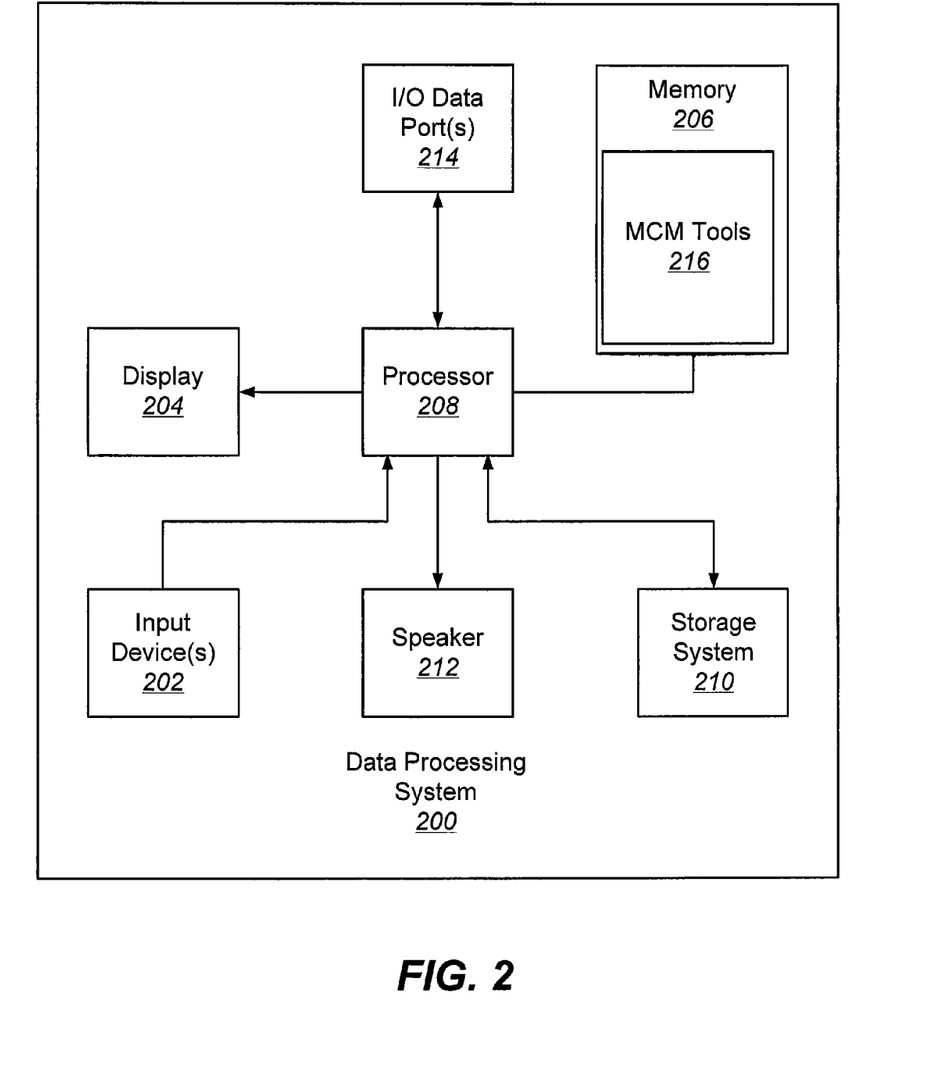
FIG. 2 illustrates a data processing system that may be used to implement the Mobile Content Management (MCM) server of FIG. 1 in accordance with some embodiments of the inventive subject matter.

Referring now to FIG. 2, a data processing system 200 that may be used to implement the MCM server 130 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MCM tools module 216 that may be configured to provide the mobile collaboration modules 110, 115 and the enterprise collaboration module 127 of FIG. 1 according to some embodiments of the inventive subject matter.

Figure 3:
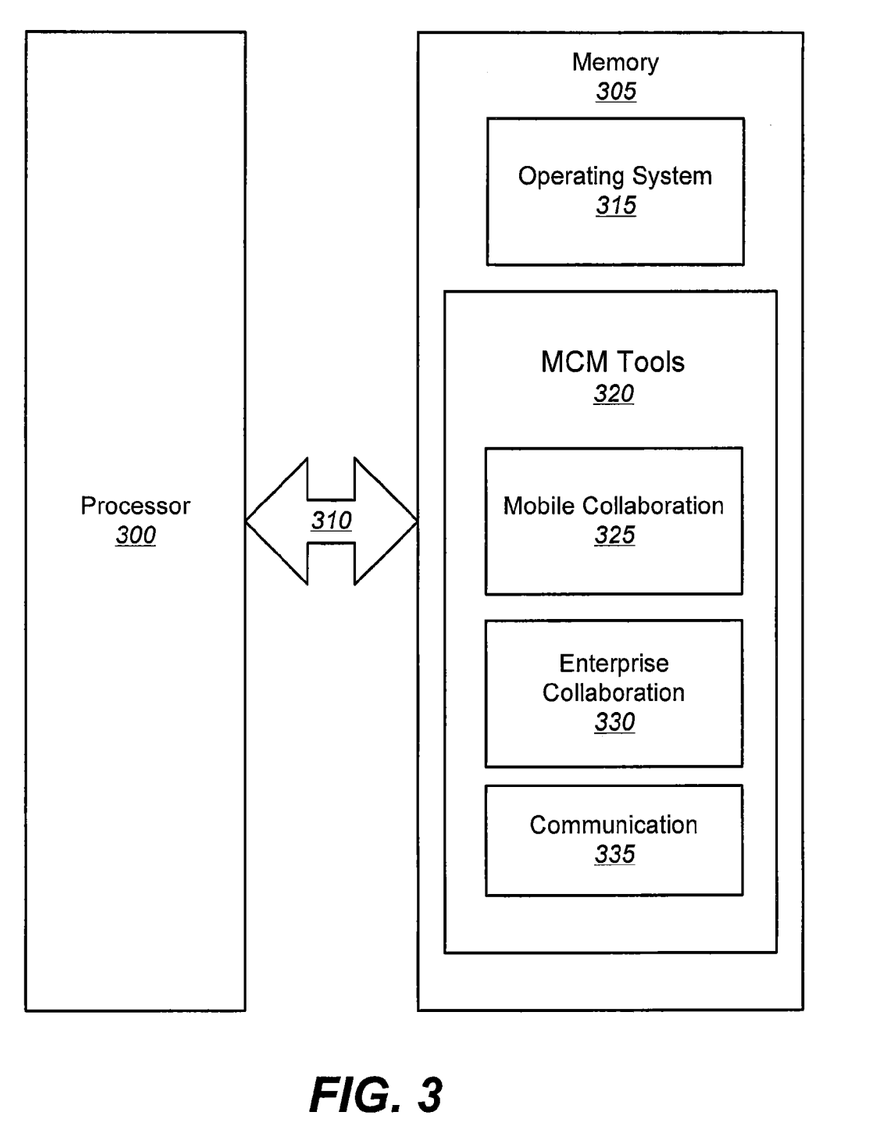
FIG. 3 is a block diagram that illustrates a software/hardware architecture for the MCM server of FIG. 1 in accordance with some embodiments of the present inventive subject matter.

FIG. 3 illustrates a processor 300 and memory 305 that may be used in embodiments of data processing systems, such as the MCM server 130 of FIG. 1 and the data processing system 200 of FIG. 2, respectively, for facilitating mobile content collaboration according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating mobile content collaboration in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MCM tools module 320. In particular, the operating system 315 may manage the data processing system's software and/or hardware resources and may coordinate execution of programs by the processor 300. The MCM tools module 320 may comprise a mobile collaboration module 325, an enterprise collaboration module 330, and a communication module 335. The mobile collaboration module 325 corresponds to the mobile collaboration modules 110 and 115 of FIG. 1 and the enterprise collaboration module 330 corresponds to the enterprise collaboration module 127 of FIG. 1. As described above, the enterprise collaboration module 330 is configured to manage access to content residing on the enterprise 125 servers in response to requests from users via the mobile collaboration modules 325.

The communication module 335 may be configured to facilitate communication between the MCM server 130 and other entities, such as the mobile devices 105, 112 and the enterprise 125.

Although FIG. 3 illustrates hardware/software architectures that may be used in data processing systems, such as the MCM server 130 of FIG. 1 and the data processing system 200 of FIG. 2, respectively, for facilitating mobile content collaboration according to some embodiments of the inventive subject matter, it will be understood that the present invention is not limited to such a configuration but is intended to encompass any configuration capable of carrying out operations described herein.

Figure 4:
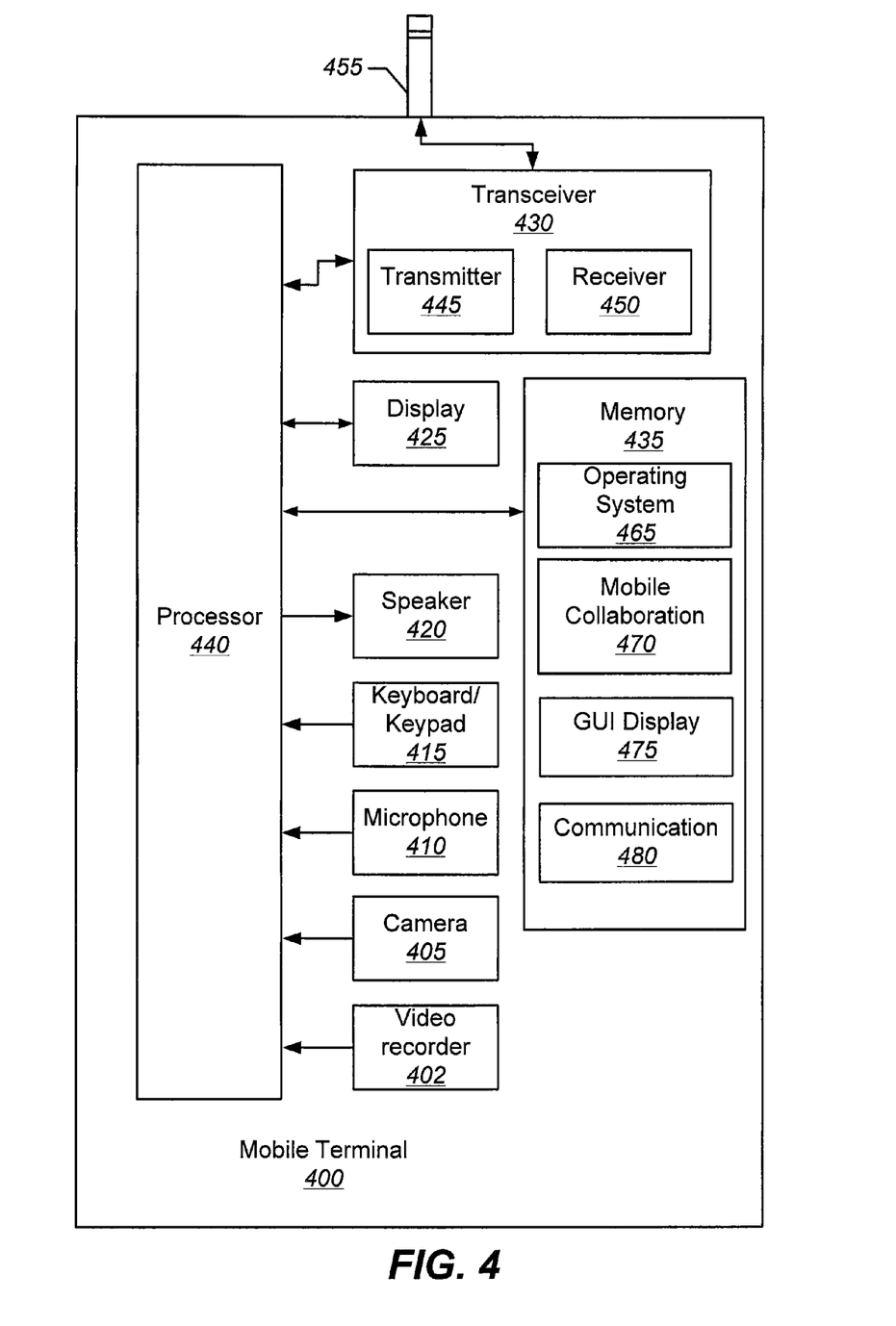
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminals 105, 112 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitate mobile content collaboration in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to four or more categories of software and/or data: an operating system 465, a mobile collaboration module 470, a GUI display module 475, and a communication module 480. The operating system 465 generally controls the operation of the mobile terminal 400. In particular, the operating system 465 may manage the mobile terminal's software and/or hardware resources and may coordinate execution of programs by the processor 440. The mobile collaboration module 470 corresponds to the mobile collaboration modules 110, 115 of FIG. 1, which has been described above. The Graphical User Interface (GUI) display module 475 may be configured to cooperate with the mobile collaboration module 470 to present collaboration options to a user of the mobile device 400 when the user accesses enterprise content. As described above, in some embodiments, the mobile collaboration module 470 may present the user of the mobile device through the GUI display module 475 a first option of sending a second user of a mobile device a message that identifies a particular content item and invites the second user to collaborate on the content item asynchronously. The first user may also be presented with a second option of contacting the second user so as to invite the second user to collaborate via the content item synchronously via an audio and/or video communication session in real time. This may allow the two parties to collaborate on the content item through a multi-media communication session.

The communication module 480 may be configured to facilitate communication between the mobile terminal 105/400 and other entities, such as the enterprise 125 and MCM server 130.

Although FIG. 4 illustrates an exemplary software and hardware architecture that may be used for facilitating mobile content collaboration according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MCM server 130, data processing system 200, hardware/software architecture of FIG. 3, enterprise 125 servers and mobile device 105, 112/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
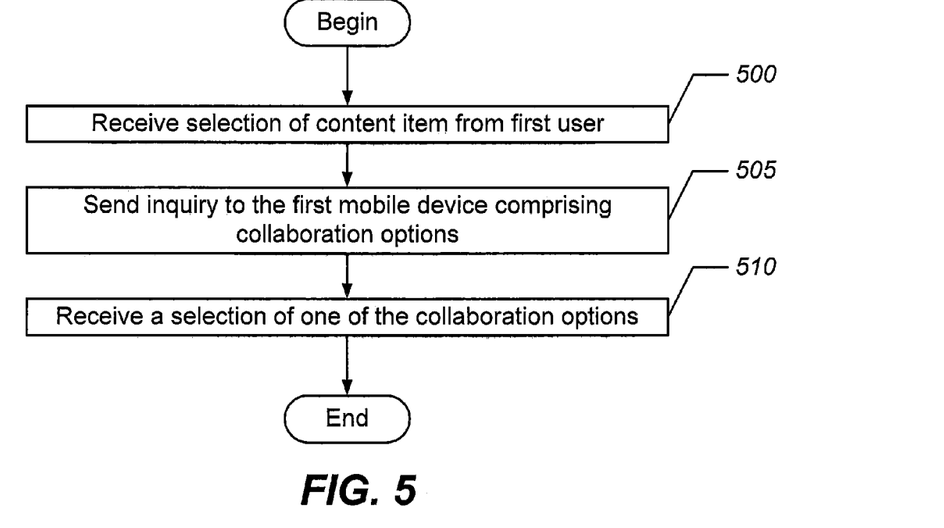
FIGS. 5 and 6 are flowcharts that illustrate operations for facilitating mobile content collaboration in accordance with some embodiments of the inventive subject matter.
Figure 6:
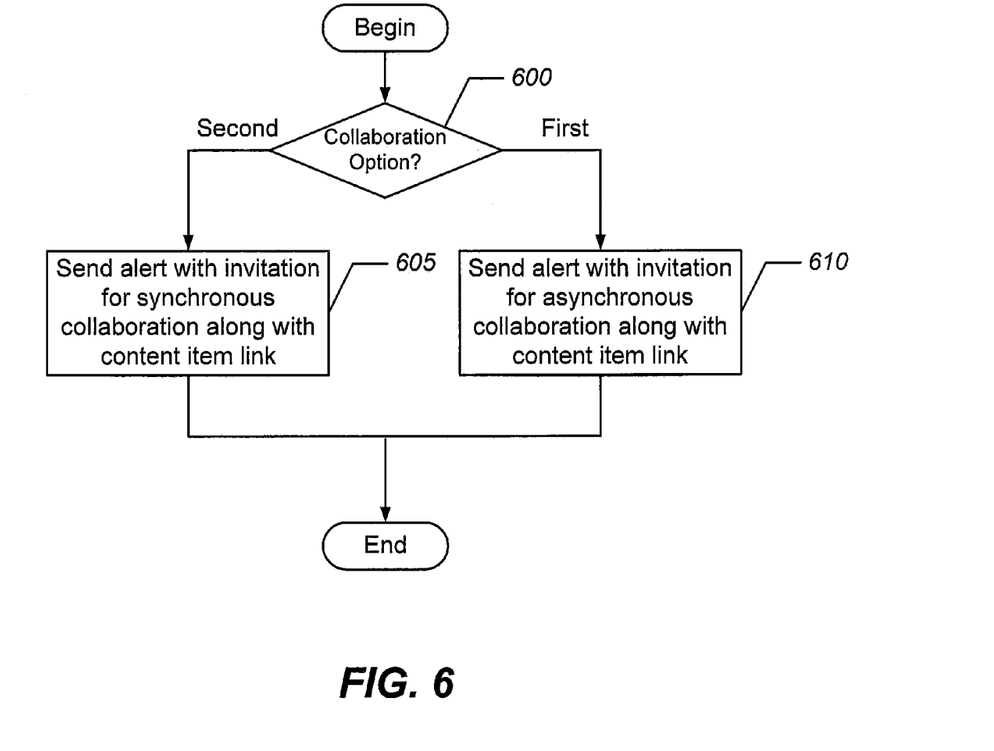

FIGS. 5 and 6 are flowcharts that illustrate operations for facilitating mobile content collaboration in accordance with some embodiments of the inventive subject matter. Referring to FIG. 5, operations begin at block 500 where a first user, e.g., a user of mobile device 105, selects a content item from the enterprise 125 server(s) via the mobile collaboration module 110. The selection is received at the enterprise collaboration module 127 residing on the enterprise 125 server(s). An inquiry is sent from the enterprise collaboration module 127 to the mobile collaboration module 110 at block 505 comprising collaboration options for the first user. The mobile collaboration module 115 displays the options via the GUI display module 475. These options may include a first option of sending a second user (e.g., the user of mobile device 112) a message that identifies the content item and inviting the second user to collaborate on the content item asynchronously. The first user may also be presented with a second option of contacting the second user so as to invite the second user to collaborate on the content item synchronously via an audio and/or video communication session in real time. This may allow the two parties to collaborate on the content item through a multi-media communication session. The enterprise collaboration module 127 may receive a selection of one of the collaboration options at block 510. An address of the mobile device of the second user may be identified responsive to receiving the selection of the first option of the second option and a message may be send addressed to the address of the second mobile device that comprises an alert for the second user.

Figure 7A:
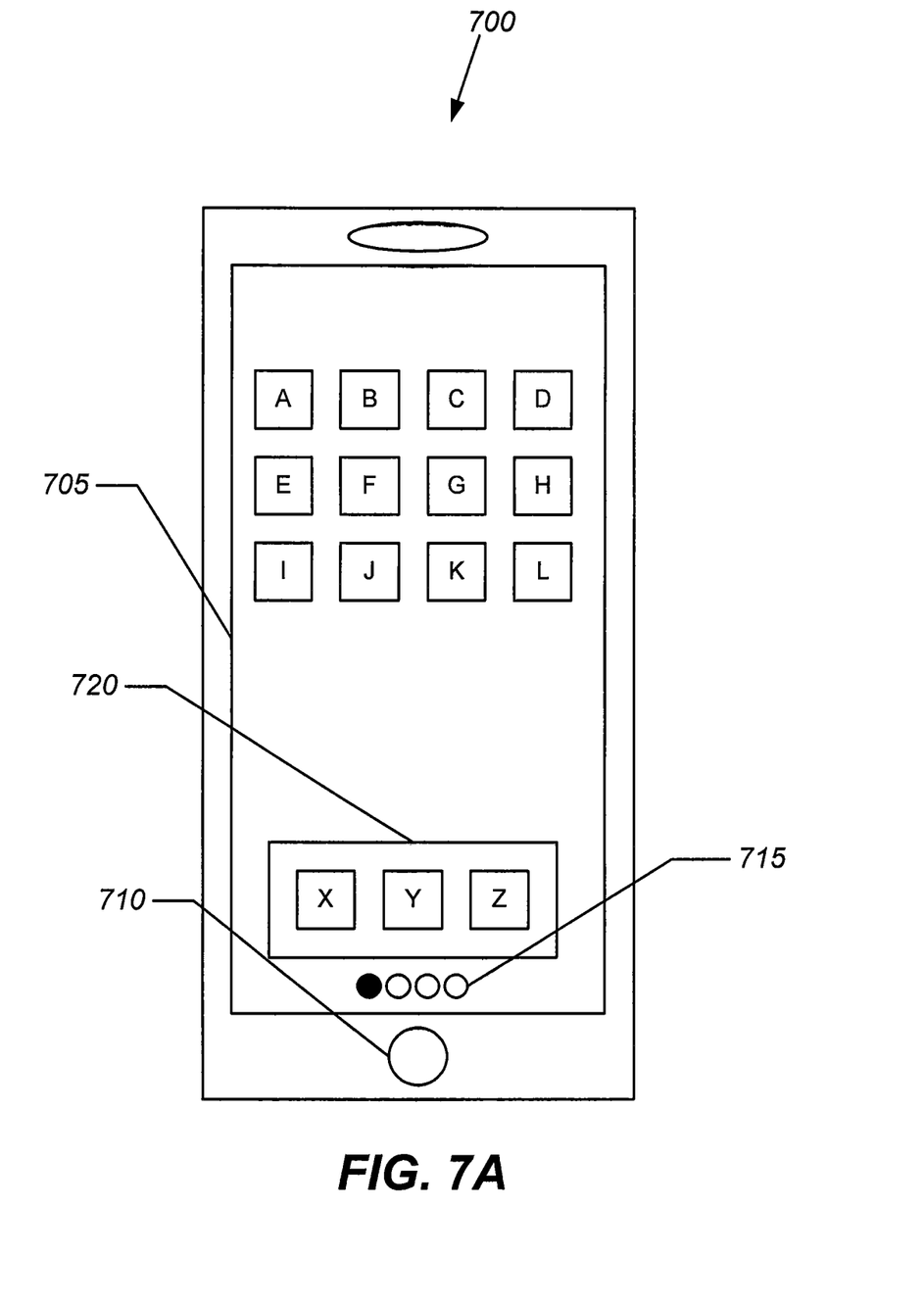
FIGS. 7A, 7B, 8A, and 8B are flowcharts that illustrate user interfaces on mobile devices for facilitating mobile content collaboration in accordance with some embodiments of the inventive subject matter.

The content collaboration options will be described in further detail, according to some embodiments of the inventive subject matter with respect to FIG. 6. Operations begin at block 600 where a user of a mobile device (e.g., mobile device 105) may select a particular collaboration option for collaborating on a content item identified from the enterprise 125 server(s). FIG. 7A illustrates a user interface provided by the GUI module 475 for mobile devices 105, 112 according to some embodiments of the inventive subject matter. As shown in FIG. 7A, the mobile device 700 device comprises a display 705 on which thumbnail icons A through L (FIG. 7A) are used to represent native and downloaded applications. The user interface comprises multiple pages as represented by the page icon 715 where the particular circle highlighted represents a particular page currently being displayed. The mobile device 700 includes a home button 710 that can be invoked to return the user interface page one of the display 705, which may be considered a home page that the mobile device 700 displays when powered on or when awakened from a sleep or inactive state. The user interface may further include a static display portion 720, which remains displayed on all pages of the user interface. As shown in FIG. 7A, icons corresponding to applications X, Y, and Z are assigned to the static display portion 720. One of the icons A-L or X-Z may be used to invoke the mobile collaboration module 110.

Figure 7B:
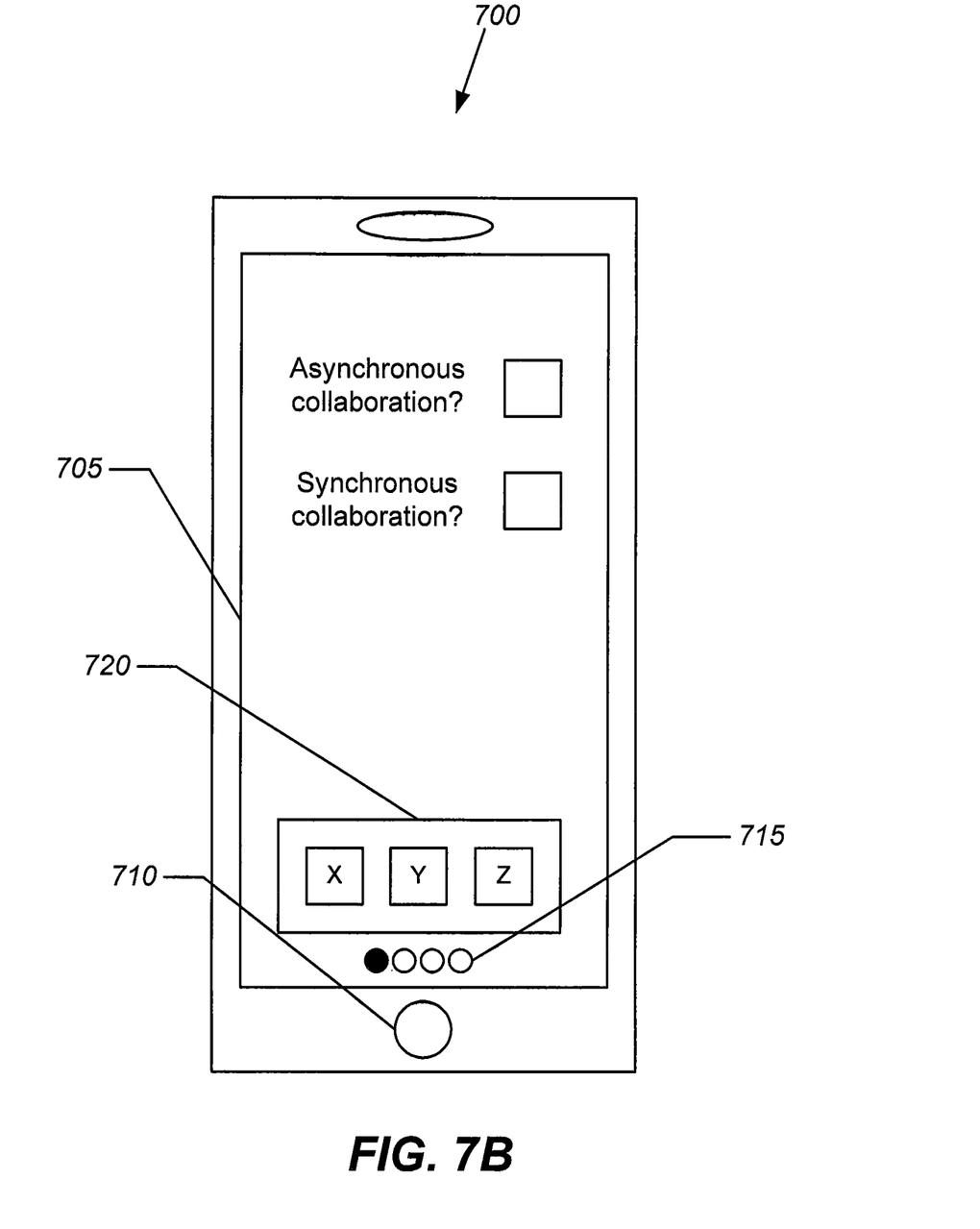

Referring now to FIG. 7B, upon selection of a content item from the enterprise 125 server(s) via the mobile collaboration module 110, the enterprise collaboration module 127 may send an inquiry back to the mobile collaboration module 110 with the collaboration options for the first user. Such options are illustrated, for example, in FIG. 7B where the user is presented with an asynchronous collaboration option and a synchronous (e.g., real time) collaboration option. Responsive to the user selecting the asynchronous option, operations continue at block 610 of FIG. 6 where the mobile collaboration module 110 sends an alert with an invitation for asynchronous collaboration on the content item to the user associated with the mobile device 112 by way of the enterprise collaboration module 127 and the mobile collaboration module 115 on the mobile device 112.

Figure 8A:
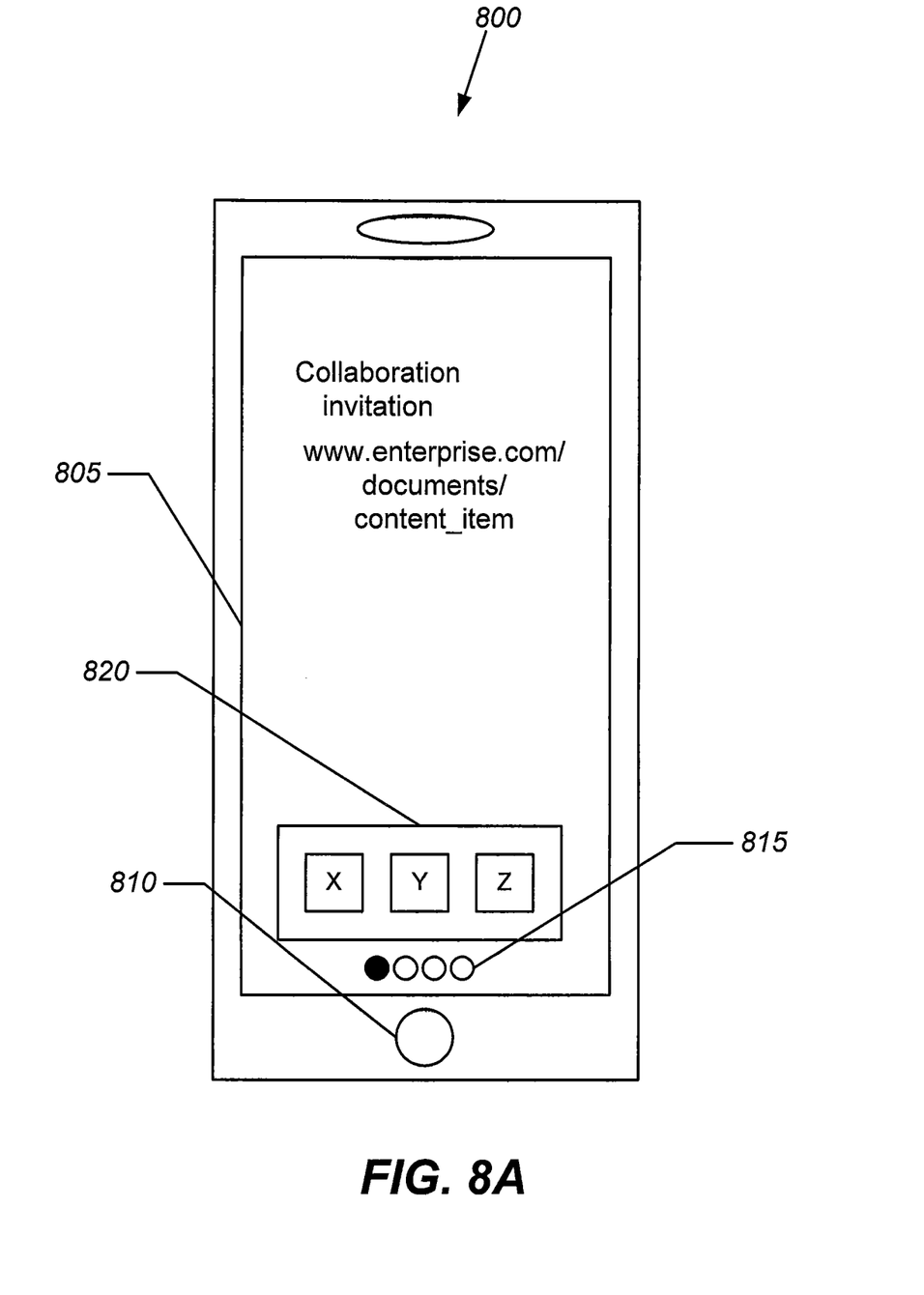

FIG. 8A illustrates a user interface provided by the GUI module 475 for mobile devices 105, 112 when they receive an invitation to collaborate on a content item from another mobile device. Reference designators 800, 805, 810, 815, and 820 correspond to reference designators 700, 705, 810, 815, and 820 described above with reference to FIG. 7A. Referring to FIG. 8A, the collaboration invitation is displayed on the mobile device 112 along with a link to the content item on the enterprise 125 server(s). In accordance with various embodiments of the inventive subject matter, the invitation may be sent via Short Message Service (SMS) message containing the link or an email message containing the link. Moreover, when the user of the mobile device 112 accesses the content item via the link (or other type of identifier) provided in the invitation, the enterprise collaboration module 127 may provide various features to assist both the first and second users of the mobile devices 105 and 112 in collaboration on the content item including, but not limited to, change control, version control, and comment capability, such as metadata associated with the content item and/or links to social media applications both public and internal to the enterprise.

Figure 8B:
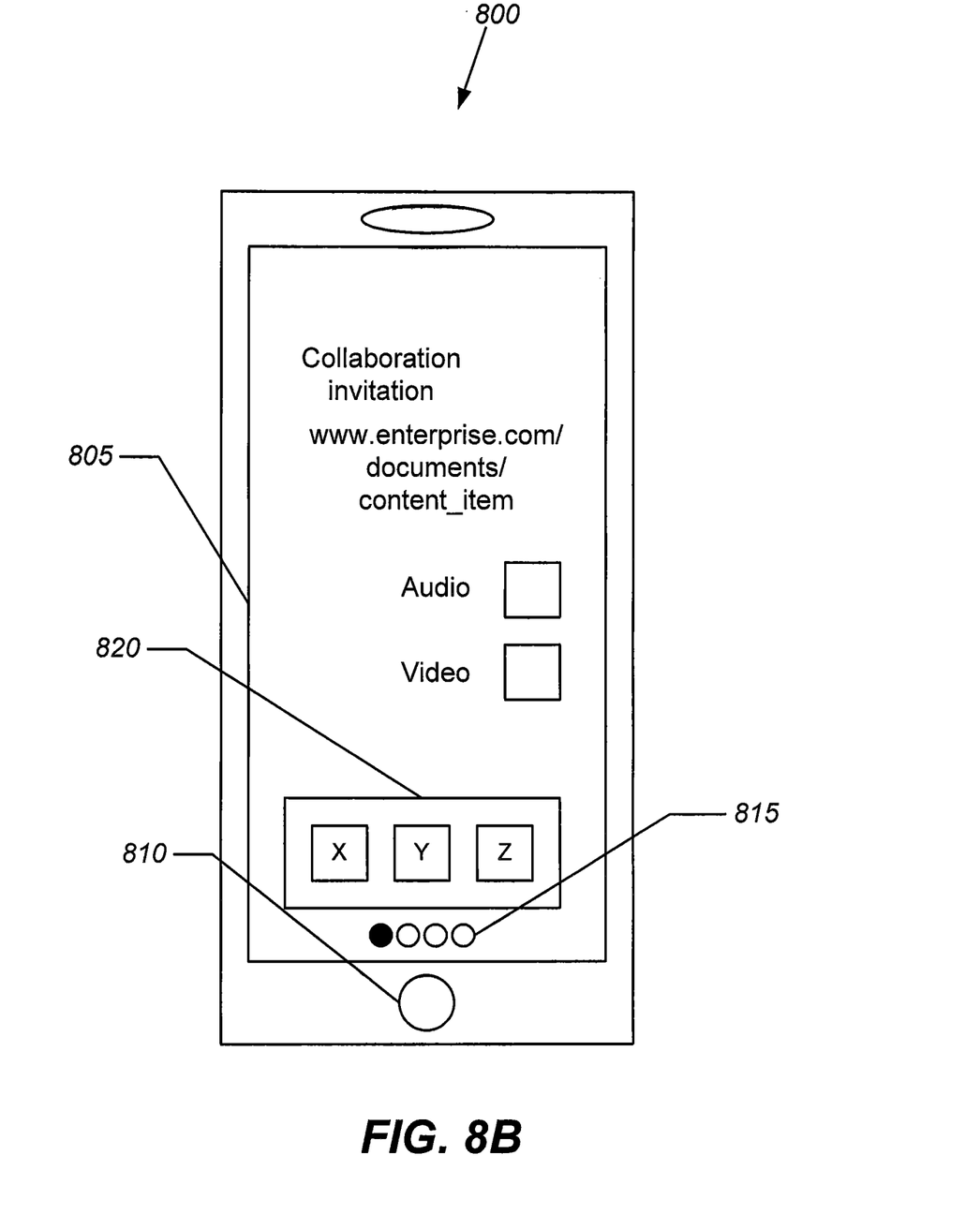

Returning to FIG. 6, responsive to the user selecting the synchronous option, operations continue at block 605 where the mobile collaboration module 110 sends an alert with an invitation for synchronous (e.g., real time) collaboration on the content item to the user associated with the mobile device 112 by way of the enterprise collaboration module 127 and the mobile collaboration module 115 on the mobile device 112. This is illustrated in FIG. 8B where the collaboration invitation is displayed on the mobile device 112 along with a link to the content item on the enterprise 125 server(s). In addition, the user of the mobile device 112 is presented with an option of establishing a communication session with the user of the mobile device 105 by way of the enterprise collaboration module 127 to collaborate on the content item in real time via audio and/or video. In accordance with various embodiments of the inventive subject matter, the invitation may be sent via Short Message Service (SMS) message containing the link or an email message containing the link. Moreover, when the user of the mobile device 112 accesses the content item via the link (or other type of identifier) provided in the invitation, the enterprise collaboration module 127 may provide various features to assist both the first and second users of the mobile devices 105 and 112 in collaboration on the content item including, but not limited to, change control, version control, and comment capability, such as metadata associated with the content item and/or links to social media applications both public and internal to the enterprise.

Embodiments of the present inventive subject matter may provide a mobile real time collaboration capability to provide collaboration applications on mobile devices and enterprise server(s) to allow users of mobile devices in an enterprise to collaborate on enterprise content. The content collaboration application on the enterprise server is configured to manage access to content stored on enterprise server(s) via the collaboration applications residing on the mobile devices and to facilitate collaborative communication connections between users via the collaborative applications running on the respective mobile devices. In some embodiments, a first user can select a content item residing on the enterprise server and a window will pop-up presenting the first user with a first option of sending a second user a message that identifies the content item and inviting the second user to collaborate on the content item. The first user may also be presented with a second option of contacting the second user so as to invite the second user to collaborate on the content item via an audio and/or video communication session. This may allow the two parties to collaborate on the content item through a multi-media communication session.

Selection of the first option results in a message, such as an email, SMS message, or other type of alert being transmitted to the second user. When the second user receives the message and proceeds to access the content item identified in the alert via a link or other type of identifier, the content collaboration application on the enterprise server receives a request for the content item and provides access to the content item to the second user. The content collaboration application on the enterprise server may provide various features to assist the first and second users in collaborating on the content item including, but not limited to, change control, version control, and comment capability, such as links to social media applications both public and internal to the enterprise.

Selection of the second option results in a message to the second user that invites the second user to participate in an audio and/or video communication session to collaborate on the content item. If the second user accepts the invitation, the content collaboration application on the enterprise server facilitates the establishment of a communication session between the respective mobile devices of the two users and associates the communication session with the content item on the enterprise server. The two users may then view, discuss, and modify the content item while maintaining an audio and/or video communication session with each other. The content collaboration application on the enterprise server may provide the same or similar features described above with respect to change control, version control, comment capability, and the like.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
    performing operations as follows on a processor:
    receiving a selection of a content item by a first user from a first mobile device;
    sending an inquiry to the first mobile device comprising collaboration options for the content item, the collaboration options comprising a first option to invite a second user to collaborate asynchronously on the content item and a second option to invite the second user to collaborate synchronously on the content item;
receiving a selection of one of the first option and the second option by the first user from the first mobile device;
determining whether the selection comprises the first option or the second option;
responsive to determining that the selection comprises the first option, generating a first message comprising an invitation to the second user to collaborate asynchronously on the content item and a link for accessing a file of the content item;
responsive to determining that the selection comprises the second option, generating a second message comprising an invitation to the second user to collaborate synchronously on the content item and information used to establish a link for establishing at least one of a video and an audio communication session between the first mobile device and a second mobile device associated with the second user;
identifying an address of the second mobile device responsive to receiving the selection of one of the first option and the second option;
sending the generated one of the first and second messages addressed to the address of the second mobile device; and
when the second message is sent and responsive to the second user selecting the link in the second message, initiating establishment of the at least one of the video and the audio communication session between the first mobile device and the second mobile device.

2. The method of claim 1,
wherein the generated one of the first and second messages comprises a Short Message Service (SMS) message.

3. The method of claim 1,
wherein the generated one of the first and second messages comprises an email message.

4. The method of claim 1,
further comprising providing a content management feature responsive to the second user accessing the file of the content item via the link in the first message.

5. The method of claim 4, wherein the content management feature comprises one of change control, version control, and comment capability for the content item.

6. The method of claim 5, wherein the comment capability comprises a link to a social media application.

7. The method of claim 1, wherein the communication session is an audio communication session.

8. The method of claim 1, wherein the communication session is a video communication session.

9. The method of claim 1,
further comprising providing a content management feature responsive to the second user accepting the invitation in the second message to collaborate synchronously on the content item.

10. The method of claim 9, wherein the content management feature comprises one of change control, version control, and comment capability for the content item.

11. The method of claim 10, wherein the comment capability comprises a link to a social media application.

12. A system, comprising:
a processor; and
a memory coupled to the processor and comprising computer readable program code embodied in the memory that when executed by the processor causes the processor to perform operations comprising:
receiving a selection of a content item by a first user from a first mobile device;
sending an inquiry to the first mobile device comprising collaboration options for the content item, the collaboration options comprising a first option to invite a second user to collaborate asynchronously on the content item and a second option to invite the second user to collaborate synchronously on the content item;
receiving a selection of one of the first option and the second option by the first user from the first mobile device;
determining whether the selection comprises the first option or the second option;
responsive to determining that the selection comprises the first option, generating a first message comprising an invitation to the second user to collaborate asynchronously on the content item and a link for accessing a file of the content item;
responsive to determining that the selection comprises the second option, generating a second message comprising an invitation to the second user to collaborate synchronously on the content item and information used to establish a link for establishing at least one of a video and an audio communication session between the first mobile device and a second mobile device associated with the second user;
identifying an address of the second mobile device responsive to receiving the selection of one of the first option and the second option;
sending the generated one of the first and second messages addressed to the address of the second mobile device; and
when the second message is sent and responsive to the second user selecting the link in the second message, initiating establishment of the at least one of the video and the audio communication session between the first mobile device and the second mobile device.

13. A computer program product, comprising:
a tangible computer readable storage medium comprising computer readable program code embodied in the medium that when executed by a processor causes the processor to perform operations comprising:
receiving a selection of a content item by a first user from a first mobile device; sending an inquiry to the first mobile device comprising collaboration options for the content item, the collaboration options comprising a first option to invite a second user to collaborate asynchronously on the content item and a second option to invite the second user to collaborate synchronously on the content item;
receiving a selection of one of the first option and the second option by the first user from the first mobile device;
determining whether the selection comprises the first option or the second option;
responsive to determining that the selection comprises the first option, generating a first message comprising an invitation to the second user to collaborate asynchronously on the content item and a link for accessing a file of the content item;
responsive to determining that the selection comprises the second option, generating a second message comprising an invitation to the second user to collaborate synchronously on the content item and information used to establish a link for establishing at least one of a video and an audio communication session between the first mobile device and a second mobile device associated with the second user;
identifying an address of the second mobile device responsive to receiving the selection of one of the first option and the second option;
sending the generated one of the first and second messages addressed to the address of the second mobile device; and
when the second message is sent and responsive to the second user selecting the link in the second message, initiating establishment of the at least one of the video and the audio communication session between the first mobile device and the second mobile device.

\* \* \* \* \*